United States Patent Office 3,798,302
Patented Mar. 19, 1974

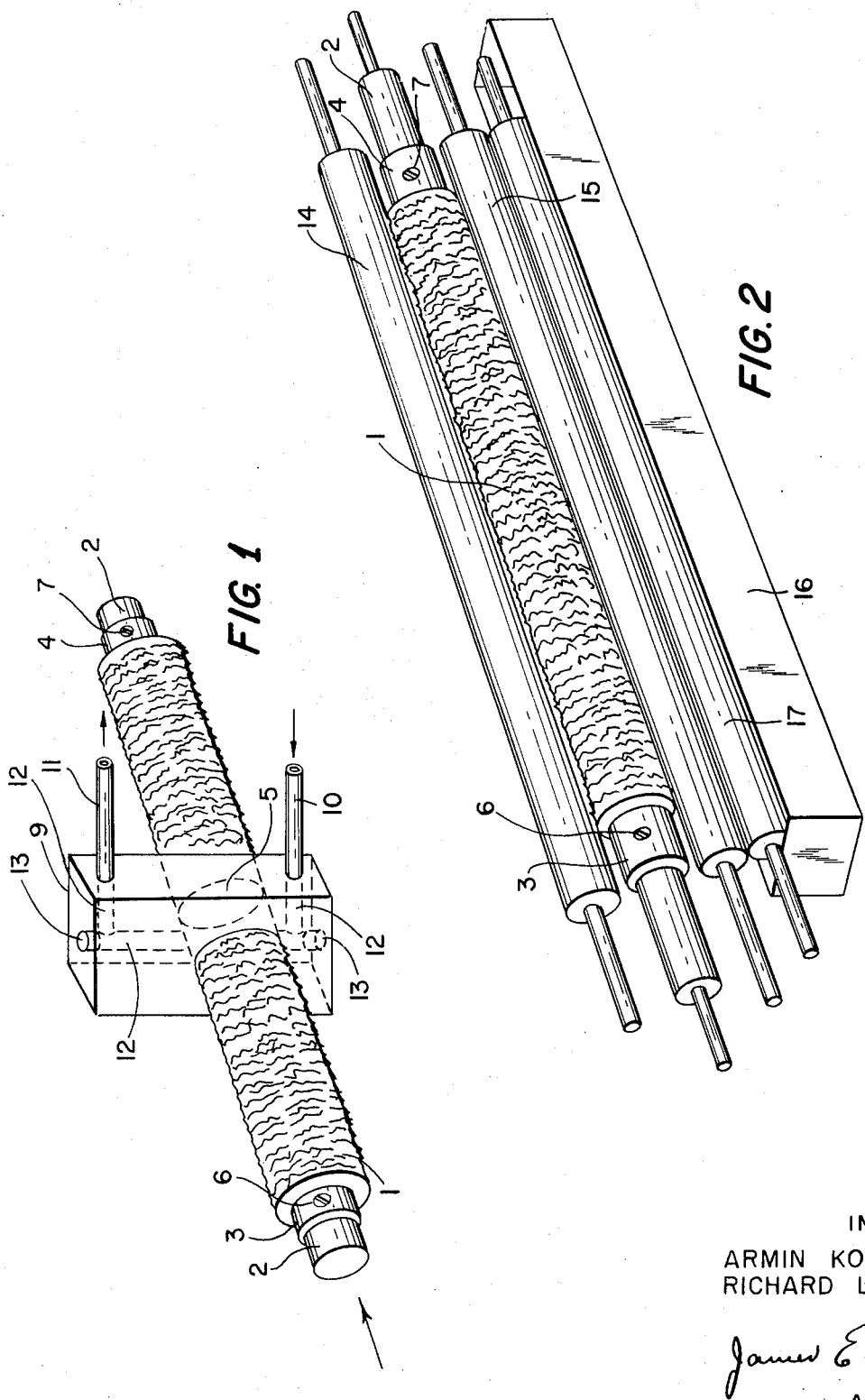

3,798,302
PROCESS FOR IMPROVING THE SHAPE OF A STICK OF LONGITUDINALLY SHIRRED ARTIFICIAL SAUSAGE CASING
Armin Kostner, Wiesbaden, and Richard Lenhart, Wiesbaden-Frauenstein, Germany, assignors to Kalle Aktiengesellschaft, Wiesbaden-Biebrich, Germany
Filed Dec. 28, 1971, Ser. No. 213,030
Claims priority, application Germany, Dec. 29, 1970, P 20 64 147.8
Int. Cl. B29c 15/00
U.S. Cl. 264—310
2 Claims

ABSTRACT OF THE DISCLOSURE

Process for improving the shape of a stick of longitudinally shirred artificial sausage casing of regenerated cellulose or thermoplastic material which comprises smoothing the entire round outer surface of the stick while maintaining the length thereof constant. Smoothing is performed by passing the stick through a closely calibrated round zone while heating the stick and without twisting it or by contacting the stick with heated rollers.

---

This invention relates to a process for improving the shape of longitudinally shirred sections of artificial sausage casings, i.e. so-called "sticks," of regenerated cellulose or thermoplastic material, e.g. polyamide, polypropylene, or polyethyleneglycol terephthalate.

It is known to shirr artificial sausage casings of regenerated cellulose or of synthetic material in the longitudinal direction on a mandrel, so that a shirred section of casing having a given length is shirred to a considerably shorter section. This is then reinforced, while still on the mandrel, by lengthwise compression, so that its length is reduced to half the original length thereof or even less. A section of artificial sausage casing compressed in this manner will be designated as a "stick" for the purposes of the present invention. Depending on the way in which they are to be used, more or less stringent standards of quality must be fulfilled by these sticks. In more recent methods of processing, they must meet relatively high requirements with regard to their shape, and in particular their straightness and stiffness, among others.

Many of the known processes for shirring sections of artificial sausage casings produce sticks which do not come up to these high standards of straightness and stiffness. The present invention provides a process by which the straightness and possibly also the stiffness of the sticks may be improved.

Methods for improving the straightness and stiffness of sticks of sausage casing are already known. For this purpose, an additional relative motion around the mandrel was imparted to the sausage casing, while it was advanced along the mandrel for shirring and compression, so that the shirring folds were wound into a helical pattern which has a longer phase than the pattern of the shirring folds and thus is superimposed over the latter. The process was performed in such a manner that the shirred sausage casings were pushed against a resistance through a narrow passage while twisting it. In this manner, the shirred sausage casing was compressed into a stick and simultaneously the helical pattern was produced. Apart from the helical pattern formed thereon, the round surface of the stick was smoothed by this process.

The present invention improves the shape, in particular the straightness, of sticks of artificial sausage casings by means of a simpler process. For improving the shape of a stick of artificial sausage casing of regenerated cellulose or of thermoplastic material, which has been longitudinally shirred and reinforced by compressing it, the above described known process is used as a basis, in so far as, during improvement, the round outer surface of the longitudinally shirred section of artificial sausage casing is smoothed. In the process according to the invention, however, the round outer surface of a stick formed by compressing a shirred section of sausage casing is smoothed, the entire round surface of the stick is smoothed, and the length of the stick is maintained constant while its outer surface is being smoothed.

While their surfaces are smoothed, the sticks are positioned on a mandrel, preferably on the same mandrel on which the sections of sausage casing were shirred and compressed into sticks. While their surfaces are being smoothed, the length of the sticks is maintained constant by stops which may be attached to the mandrel.

Smoothing of the surface of the sticks may be performed, e.g., by pushing the sticks through a closely calibrated passage without twisting them relative to the mandrel. In this manner, the uppermost peaks of the shirring folds protruding from the round surface of the sticks are bent down. A narrow passage used for smoothing the surface of the stick in accordance with the present invention may have a diameter which is smaller by 0.3 to 0.7 mm., normally by about 0.5 mm., than the greatest outer diameter of the stick, i.e. the diameter measured at the most protruding folds.

Another means for smoothing the surface of the stick may be to roll it. For this purpose, one or more rolls are used which extend parallel to the stick and are pressed down upon its round surface. The stick may be rotated around its longitudinal axis and the roll or rolls be stationary, or alternatively, the roll or rolls may be moved around the stick.

Preferably, the sticks are heated while their surfaces are smoothed, most easily by heating the smoothing device used. In this manner, the smoothed surfaces of the sticks are fixed more rapidly and more effectively.

The process will be further illustrated in the following with reference to the accompanying drawings, the two figures of which illustrate two different embodiments of the process according to the invention.

In the process illustrated by FIG. 1, the stick 1 consisting of a longitudinally shirred and compressed section of artificial sausage casing is firmly positioned on the mandrel 2. The length of the stick is limited by the two check rings 3 and 4 which are secured by setscrews 6 and 7 against displacement along the mandrel. The mandrel with the stick thereon is pushed through a narrow round passage 5.

The round narrow passage 5 is formed by a round bore in a metal block 9 which is provided with further bores 12, through which a heating medium may be passed. The sockets 10 and 11 serve for supplying and draining the heating medium. The bores for the heating medium, which may be a liquid, are closed by the plugs 13.

In the embodiment of the invention shown in FIG. 2, the stick 1 is also firmly positioned on the mandrel 2. In the example shown in FIG. 2, smoothing of the surface of the stick is performed by means of a roll 14, which is arranged parallel to the mandrel 2 and which is capable of rolling under pressure upon the stick when the stick is rotated. Rotation may be effected in known manner and thus is not illustrated in detail. If heat is to be applied while the surface of the stick is being smoothed, the roll 14 is advantageously heated. For this purpose, radiant heat may be beamed upon the roll.

The lower roll 15 shown in FIG. 2 acts as a backing roll for the upper roll 14 and may fulfill the same purposes as the roll 14. Further, it may be used for the application of a lubricant, such as paraffin oil, if it is desired to apply such a lubricant to the surface of the stick in order to ensure a smooth passage through the sausage machine when the stick is filled. The lubricant is kept in a container 16. An applicator roll 17 in contact with the roll 15 dips into the lubricant and transfers it to the roll by wetting its surface.

By the process of the invention, the straightness of sticks of sections of longitudinally shirred sausage casings of regenerated cellulose or of thermoplastic material may be improved in an easier manner than was hitherto possible. The process has the advantage that it renders it unnecessary to twist the sticks relative to the mandrel. In the preferred embodiment of the process, in which the smoothing device is heated, the stiffness of the sticks produced is also improved.

It will be obvious to those skilled in the art that many modifications may be made within the scope of the present invention without departing from the spirit thereof, and the invention includes all such modifications.

What is claimed is:

1. A process for improving the shape of a stick of longitudinally shirred artificial sausage casing of regenerated cellulose or thermoplastic material which comprises smoothing the entire round outer surface of the stick by passing the stick through a closely calibrated round zone while heating the stick and without twisting it, and while maintaining the length thereof constant.

2. A process for improving the shape of a stick of longitudinally shirred artificial sausage casing of regenerated cellulose or thermoplastic material which comprises smoothing the entire round outer surface of the stick by rolling and heating while maintaining the length thereof constant.

References Cited
UNITED STATES PATENTS

| | | | |
|---|---|---|---|
| 3,704,483 | 12/1972 | Urbutis et al. | 99—176 X |
| 3,695,901 | 10/1972 | Winokur | 99—176 |
| 3,461,484 | 8/1969 | Arnold | 99—176 X |

MORRIS O. WOLK, Primary Examiner

S. B. DAVIS, Assistant Examiner

U.S. Cl. X.R.

17—42; 264—322